C. G. & J. H. COLWELL.
ASH PAN HOLDER.
APPLICATION FILED FEB. 24, 1913.
1,132,561.
Patented Mar. 23, 1915.
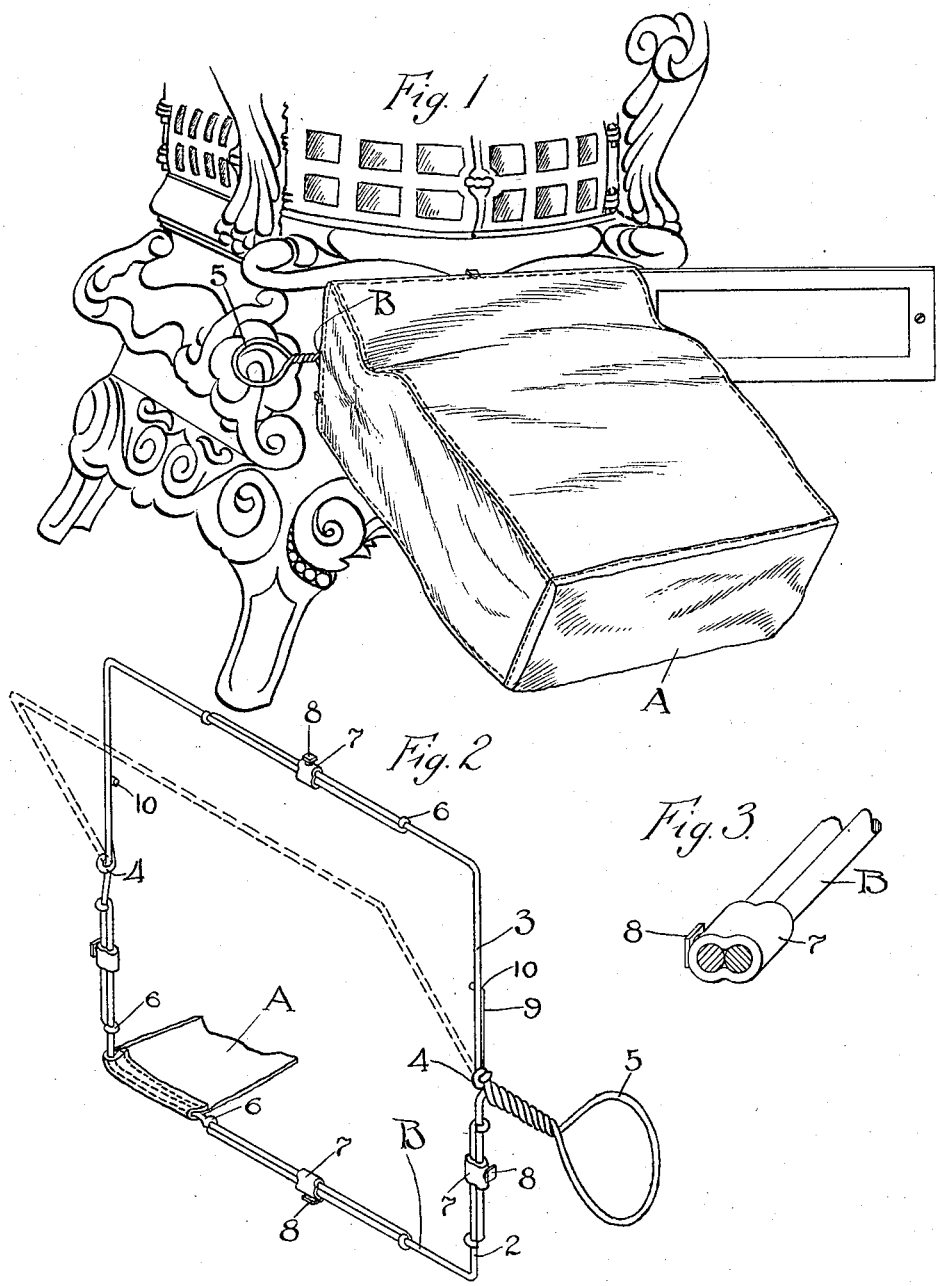
WITNESSES
INVENTORS
Carrie G. Colwell
John H. Colwell
By Lothrop & Johnson
their Attorneys

UNITED STATES PATENT OFFICE.

CARRIE G. COLWELL AND JOHN H. COLWELL, OF ST. PAUL, MINNESOTA.

ASH-PAN HOLDER.

1,132,561. Specification of Letters Patent. Patented Mar. 23, 1915.

Application filed February 24, 1913. Serial No. 750,195.

*To all whom it may concern:*

Be it known that we, CARRIE G. COLWELL and JOHN H. COLWELL, citizens of the United States, residing at St. Paul, in the county of Ramsey and State of Minnesota, have invented certain new and useful Improvements in Ash-Pan Holders, of which the following is a specification.

Our invention relates to improvements in holders designed particularly for receiving and holding the ash pan of a stove while the same is being emptied to prevent the escaping of the ashes from the pan.

To this end the invention consists in the features of construction, combination, and arrangement of parts hereinafter described and claimed.

In the accompanying drawings forming part of this specification, Figure 1 is a front elevation of the base of a stove with our invention positioned in connection with the same to receive the ash pan; Fig. 2 is a detail view of a collapsible frame forming part of our invention; and Fig. 3 is a sectional detail of a portion of the frame shown in Fig. 2.

As shown in the drawings, our invention consists of a flexible bag A supported at its open end upon the frame B. The frame B consists of wire members slidable upon each other and formed with lower and upper halves 2 and 3, the upper and lower halves having hinged connection through the medium of the connecting loops 4, a handle 5 being carried by one end of the lower frame half. The wires constituting the top and bottom of the lower and upper halves are slidably connected through the medium of the loops 6 so as to provide for the longitudinal adjustment of the frame, said wires being held in adjusted position by the collars 7 inclosing the wires and each provided with a set nut 8. The wires constituting the sides of the lower half of the frame have similar sliding adjustment to provide for the vertical adjustment of the frame and are held in adjusted positions by similar collars 7. In order to prevent the upper half of the frame swinging backward we form the sides of the lower half of the frame with upward extensions 9, the upper ends 10 of said extensions being inturned to stand behind the side wires of the upper half of the frame.

In use, where it is desired to receive and carry the ash pan as in emptying, our device is positioned in front of the ash pan opening, as indicated in Fig. 1, the frame being so held by the handle that the halves thereof will stand in extended position, as indicated in Fig. 2, the upper half resting against the offset ends of the extensions 9. The user then shoves the end of the bag inwardly sufficiently to grasp the ash pan, then pulls the ash pan back into the bag with the right hand, and with the left hand tilts the holder by the grasping of the handle 5 sufficiently to allow the upper half of the holder to drop downward into a closing position, the upper half thereby folding by gravity upon the lower half. The receptacle with the contained ash pan will be carried to the place of emptying without there being any danger of the ashes dropping or being blown from the pan. In emptying the pan the frame will be turned to open position to allow the pan being emptied.

We claim as our invention:

1. A device of the class described, comprising a flexible receptacle, and a supporting frame secured in the mouth thereof, said frame comprising a pair of pivotally-connected members each of which is formed of adjustable sections, whereby to adjust the size of the frame, one of said members being adapted to fold by gravity upon the other member and thereby close the mouth of the receptacle, and means carried by the other member to limit the gravity-actuated member when the latter is moved to open position.

2. A device of the class described, comprising a flexible receiving bag, and a supporting frame secured in the mouth of said bag, said frame being formed of two members the sides of which are pivotally connected at their contiguous portions, said members serving in their open position to distend the mouth of the bag, one of said members being adapted to fold by gravity upon the other, and thereby close the mouth of the bag, and means for limiting the movement of the gravity-actuated member when the latter is swung to position for opening the mouth of the bag.

3. A device of the class described, comprising a flexible receiving bag, and a supporting frame secured in the mouth thereof, said frame comprising two members the contiguous portions of which are pivotally connected, one of said members being capable of folding by gravity upon the other member for closing the mouth of the bag, and limiting stops carried by the latter member and against which the gravity-actuated member is adapted to contact when moved to open position.

4. A device of the class described, comprising a flexible receptacle, and a support secured within the mouth thereof for distending the same, said support comprising a pair of pivotally-connected members one of which is foldable upon the other to close the mouth of the receptacle, and extensions formed on the other member against which the folding member is adapted to contact and thereby limit the movement of said member when the same is swung to open the mouth of the receptacle.

5. A device of the class described, comprising a flexible receptacle, and a support secured in the mouth thereof, said support comprising upper and lower members the sides of which are pivotally connected, the upper member being adapted to fold upon the lower member to close the mouth of the receptacle, a handle extending laterally of the support, and extensions carried by the lower member and arranged in the path of movement of the upper member for contact by the latter when the upper member is swung to position for opening the mouth of the receptacle.

In testimony whereof we affix our signatures in presence of two witnesses.

CARRIE G. COLWELL.
JOHN H. COLWELL.

Witnesses:
H. SWANSON,
H. S. JOHNSON.

Copies of this patent may be obtained for five cents each, by addressing the "Commissioner of Patents, Washington, D. C."